J. J. GEAR.
HORSESHOE.
APPLICATION FILED NOV. 1, 1915.

1,174,848.

Patented Mar. 7, 1916.

WITNESSES
Edw. S. Hall.
J. W. Woodward.

INVENTOR
Jesse J. Gear.
BY Richard B. Owen.
ATTORNEY

UNITED STATES PATENT OFFICE.

JESSE JOHN GEAR, OF GOESSEL, KANSAS.

HORSESHOE.

1,174,848.

Specification of Letters Patent.

Patented Mar. 7, 1916.

Application filed November 1, 1915. Serial No. 59,118.

*To all whom it may concern:*

Be it known that I, JESSE JOHN GEAR, a citizen of the United States, residing at Goessel, in the county of Marion and State of Kansas, have invented certain new and useful Improvements in Horseshoes, of which the following is a specification.

This invention relates to an improved horse shoe of the type in which no nails are used for securing the shoe to the horse's hoof and the principal object of the invention is to provide an improved securing device for the shoe, the securing device comprising a hoof encircling collar and an ankle encircling collar together with means for connecting the hoof encircling collar with the shoe and with the ankle encircling collar.

Another object of the invention is to so construct the collars and connecting rod that they may be adjusted according to the size required.

Another object of the invention is to so construct the supporting device that it will securely hold the shoe in place upon the hoof and prevent the shoe from slipping.

This invention is illustrated in the accompanying drawings wherein:—

Figure 1:
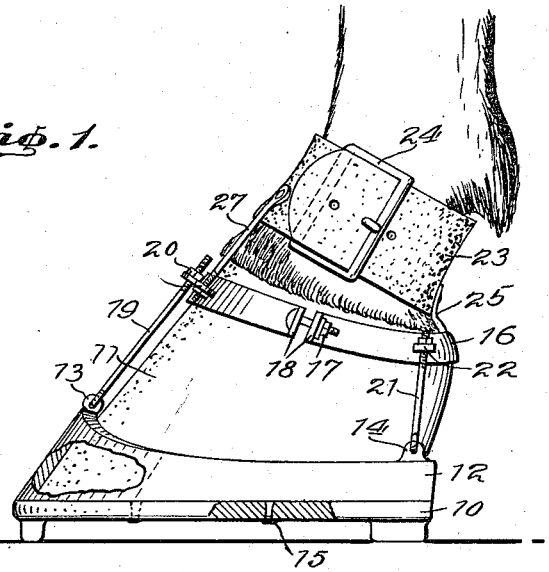
Figure 2:
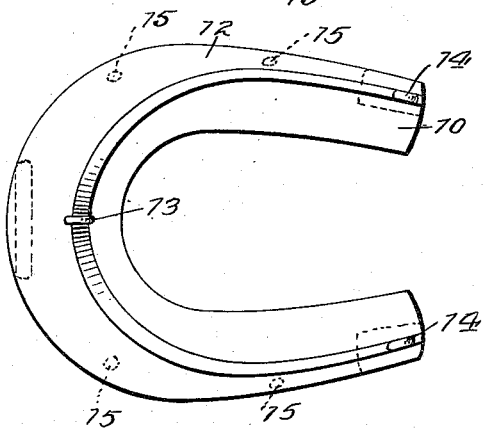
Figure 3:
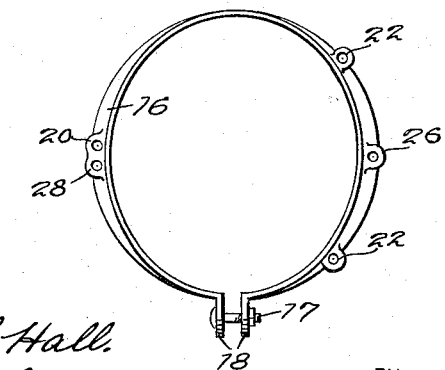

Figure 1 is a view showing the improved shoe connected with a horse's foot. Fig. 2 is a view showing the improved shoe in top plan with the supporting mechanism removed. Fig. 3 is a plan view of the hoof encircling collar.

The shoe 10 fits upon the horse's hoof 11 as shown in Fig. 1 and is provided with a side wall or flange 12 from the upper edge of which extends the eyes 13 and 14. It should be noted that this wall 12 is connected with the shoe by the rivets or other fasteners 15 so that the wall or flange can be connected with the shoe after being put in place around the hoof. After the wall is connected with the shoe 10 it forms a part of the same and therefore it could be referred to as part of the shoe.

The hoof encircling band or collar 16 is formed of resilient material and is secured about the upper portion of the hoof by means of the bolt 17 which passes through the ears 18. Eye-bolts are connected with the eyes 14 and 15, the forward eye-bolt 19 passing through the eye 20 of the collar 16 and the rear bolt 21 passing through the eye 22 of the collar 16.

It will thus be seen that the collar 23 which is formed of leather and is provided with an adjusting buckle 24 extends about the hock just above the hoof and is connected with the collar 16 by means of the strap 25 leading from the eye 26 and also by means of the eye-bolt or rod 27 which is connected with the eye 28. It will thus be seen that the shoe will be securely held in place by the collars 16 and 23 and therefore cannot slip off of the horse's hoof or move around and cause the horse to stumble. It will be further noted that this supporting device can readily accommodate itself to the size of the hoof and therefore the same supporting collars and eye-bolts can be used regardless of the size of shoe to be used.

When putting the shoe in place the wall 12 will be first placed about the hoof, the bolt 19 and the bolt 27 having been first disconnected from the collars and the collars opened, the shoe can then be connected with the wall and the collars then secured in place and the bolts 19 and 27 then again connected with the eyes 20 and 28. The shoe will then be securely held in place and cannot slip out of the desired position. When it is desired to replace the shoe, this can be very easily done by disconnecting the shoe from the wall and then putting a new one in place. Therefore it is not necessary to drive nails through the horse's hoof and thus danger of the hoof being injured is prevented.

What is claimed is:—

1. A horse shoe, a wall for said shoe, a resilient supporting collar, adjustable means connecting the wall of the shoe with said supporting collar, a flexible supporting collar, and adjustable means for connecting said resilient collar with said flexible collar.

2. A horse shoe, a resilient collar, rods pivotally connected with said horse shoe and slidably connected with said collar, a flexible collar positioned above said resilient collar, means connecting the rear portion of said resilient collar with said flexible collar, and a rod connected with said flexible collar and slidably connected with the forward portion of said resilient collar.

3. A horse shoe having a wall, a resilient collar slidably connected with the wall of said horse shoe, a flexible collar above said resilient collar, means connecting said flexible collar with the rear portion of said resilient collar, and means slidably connecting said flexible collar with the forward portion of said resilient collar.

4. A horse shoe having a wall, a lower collar, means adjustably connecting said lower collar with the wall of said horse shoe, an upper collar, means for holding said upper collar in spaced relation with the rear portion of said lower collar, and means adjustably connecting said upper collar with the forward portion of said lower collar.

5. A horse shoe, a lower collar, means adjustably connecting said lower collar with said horse shoe, an upper collar, means for connecting said upper collar with the rear portion of said lower collar, and means adjustably connecting said upper collar with the forward portion of said lower collar.

In testimony whereof I affix my signature in presence of two witnesses.

JESSE JOHN GEAR.

Witnesses:
ISAAC UNRUH,
LEONA UNRUH.

Copies of this patent may be obtained for five cents each, by addressing the "Commissioner of Patents, Washington, D. C."